United States Patent [19]

Steketee, Jr.

[11] Patent Number: 4,867,921
[45] Date of Patent: Sep. 19, 1989

[54] PROCESS FOR INSTALLING A NEW PIPE INSIDE AN EXISTING PIPELINE

[75] Inventor: Campbell H. Steketee, Jr., Salem, Oreg.

[73] Assignee: Nu-Pipe, Inc., Nashville, Tenn.

[21] Appl. No.: 76,973

[22] Filed: Jul. 28, 1987

Related U.S. Application Data

[63] Continuation-in-part of Ser. No. 864,322, Mar. 31, 1986, abandoned.

[51] Int. Cl.$^4$ ............... B29C 31/00; B29C 53/08; B29C 63/34
[52] U.S. Cl. ............................. 264/36; 264/269; 264/322; 264/516; 425/384; 425/387.1; 425/503; 156/287; 138/97
[58] Field of Search ............... 264/36, 516, 230, 322, 264/269; 138/97, 98; 156/287; 425/384, 387.1, 392, 11, 59, 503

[56] References Cited

U.S. PATENT DOCUMENTS

| | | | |
|---|---|---|---|
| 2,724,672 | 11/1955 | Rubin | 264/516 |
| 2,794,758 | 6/1957 | Harper et al. | 156/287 |
| 3,029,073 | 4/1962 | Wright et al. | 270/86 |
| 3,230,129 | 1/1966 | Kelly . | |
| 3,326,738 | 6/1967 | McLaughlin | 156/585 |
| 3,494,813 | 2/1970 | Lawrence et al. . | |
| 3,560,295 | 2/1971 | Kimbrell et al. | 264/516 |
| 3,927,164 | 12/1975 | Shimabukuro | 156/287 |
| 4,064,211 | 12/1977 | Wood | 156/287 |
| 4,394,202 | 7/1983 | Thomas et al. | 264/230 |
| 4,496,499 | 1/1985 | Brittain et al. | 264/516 |

FOREIGN PATENT DOCUMENTS

| | | | |
|---|---|---|---|
| 1194264 | 1/1985 | Canada . | |
| 0000576 | 2/1979 | European Pat. Off. . | |
| 2094862 | 9/1982 | European Pat. Off. . | |
| 0034969 | 3/1980 | Japan | 156/294 |
| 0049225 | 4/1980 | Japan | 156/294 |
| 0093413 | 7/1980 | Japan | 156/294 |
| 807413 | 1/1959 | United Kingdom . | |
| 1340068 | 12/1973 | United Kingdom . | |
| 1437273 | 5/1976 | United Kingdom . | |
| 2003576 | 3/1979 | United Kingdom . | |
| 2018384 | 8/1979 | United Kingdom . | |
| 1553408 | 9/1979 | United Kingdom . | |
| 2042673 | 9/1980 | United Kingdom | 156/294 |
| 1580438 | 12/1980 | United Kingdom . | |
| 2084686 | 5/1984 | United Kingdom . | |

*Primary Examiner*—Jan H. Silbaugh
*Assistant Examiner*—Neil M. McCarthy
*Attorney, Agent, or Firm*—Blum Kaplan

[57] ABSTRACT

A thermoplastic pipe in a flattened and folded shape and of selected characteristics is formed by manufacturing it in this reduced shape. It is inserted in the flattened and folded shape and in a pliable state into a pipeline to be lined. It is then expanded and when set serves as a rigid or semi-rigid pipe within a pipeline capable of withstanding external hydrostatic and earth pressures. The thermoplastic pipe is heated during its installation for installing it into an existing pipeline and for expanding it.

14 Claims, 1 Drawing Sheet

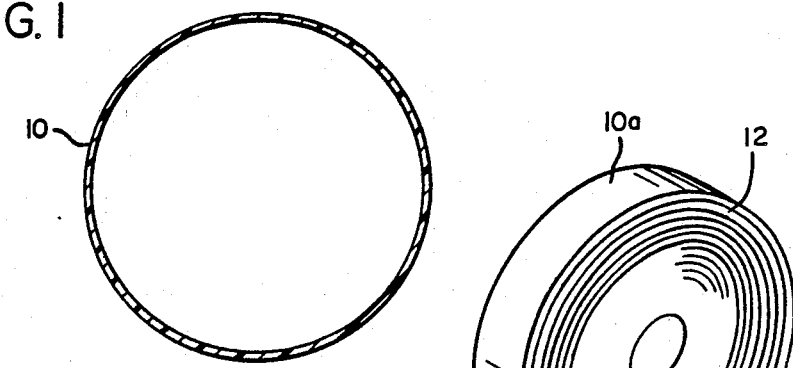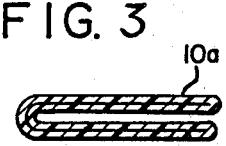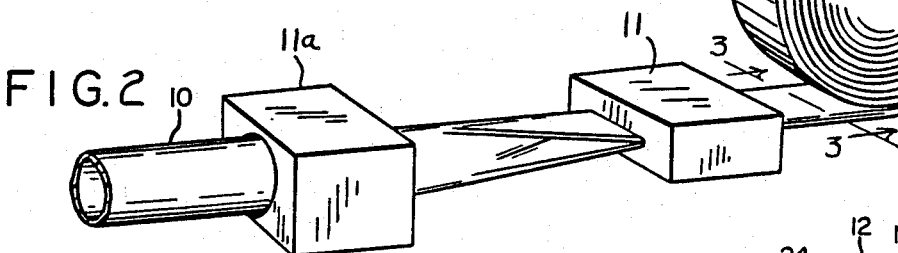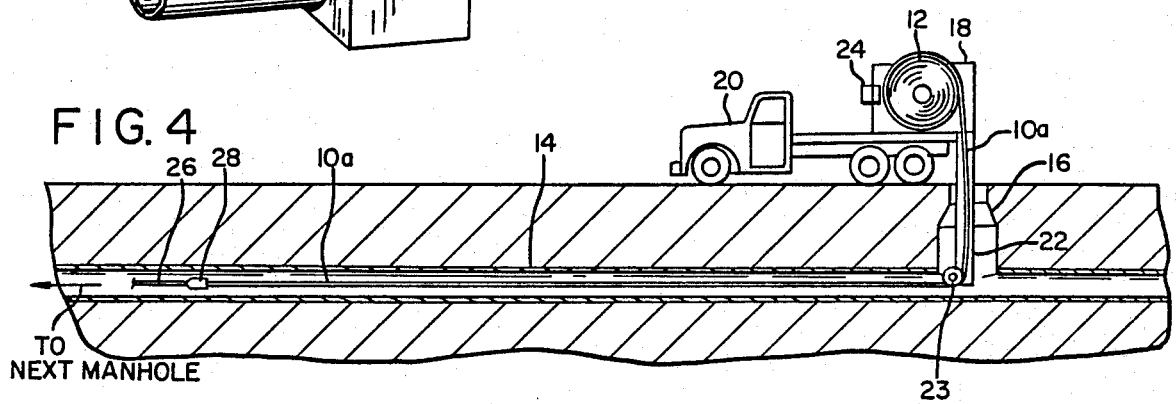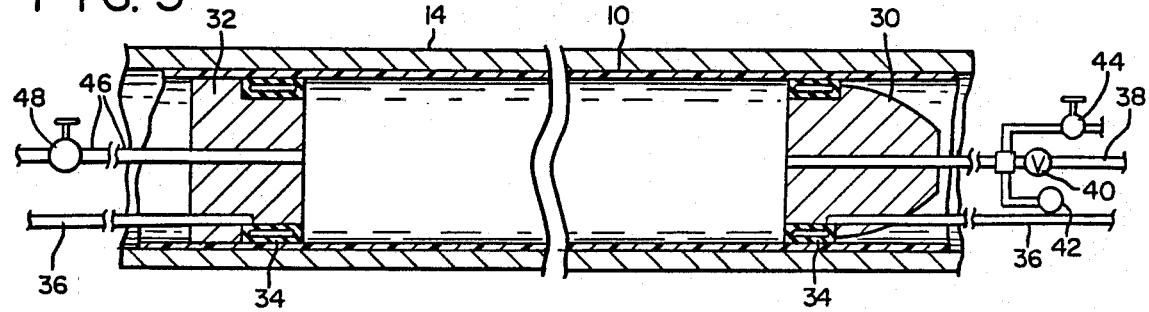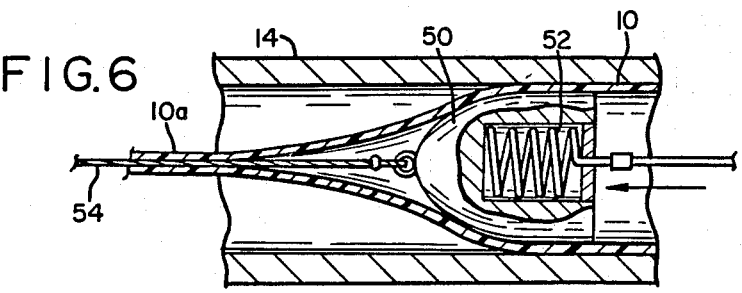

4,867,921

PROCESS FOR INSTALLING A NEW PIPE INSIDE AN EXISTING PIPELINE

REFERENCE TO PRIOR APPLICATIONS

This application is a continuation-in-part of application Ser. No. 846,322, filed Mar. 31, 1986 now abandoned.

BACKGROUND OF THE INVENTION

This invention relates to a new and useful improvement in a process and apparatus for installing a new pipe inside an existing pipe.

It has heretofore been known to repair pipe lines, such as underground sewer lines or the like, by applying an inner liner to the pipe from spaced points so as to stop leaks without the necessity of excavating the entire pipe line. In one process, pipes have been lined with a flexible plastic such as polyethylene. This process has disadvantages in that the liner reduces the effective pipe diameter substantially and also holes must be dug frequently along the pipeline in order to install the polyethylene. This makes the polyethylene process rather expensive. Another process that has been used is the type shown in U.S. Pat. Nos. 3,927,164 and 4,064,211 wherein the flexible tube is turned inside out as it is inflated into the pipe. This process is also expensive because it requires special equipment to install. Since these prior processes are relatively expensive, they are limited in their application. Furthermore, these processes use a flexible or semi-flexible liner which is not capable of withstanding any appreciable external hydrostatic or earth pressures. Thus the existing pipe most frequently is not properly repaired since if any part thereof is broken away, the liner can possibly collapse from external pressure of any magnitude such as pressures for example which exceed about 4 pounds per square inch.

SUMMARY OF THE INVENTION

According to the present invention and forming a primary objective thereof, a process and apparatus for installing a new pipe inside an existing pipe are provided that are more economical in installation and more permanent than prior processes in that said process and apparatus use relatively inexpensive and readily available pipe and pipe which is readily applied to the interior of an existing pipe with little or no excavation. Furthermore, the new pipe is of substantially thick walls and can fit tightly against the wall of the original pipe. Also, the new pipe will last indefinitely and serve as a conduit itself so as to withstand external hydrostatic and earth pressures up to and greatly exceeding 4 pounds per square inch even if pieces of the original pipe are missing.

In carrying out the objectives of the invention, conventional polyvinyl chloride (PVC) pipe or similar rigid plastic pipe having thermoplastic characteristics, is first subjected to heat and then the cross section dimension thereof reduced such as by flattening and/or folding it. This pipe may also be formed by manufacturing it in the flattened and folded configuration. This product while reduced in dimension is reheated and installed in a pipe to be rebuilt. For initial preparation of the new pipe and for storage, it can, while in its reduced condition, be wound on rolls, and then when it is to be applied to an existing pipe, it is again heated, to make it pliable, and pulled into the existing pipe. Thereupon, the reduced new pipe is expanded by heating it and applying an expanding force to its interior.

The invention will be better understood and additional objects and advantages will become apparent from the following description taken in connection with the accompanying drawings.

BRIEF DESCRIPTION OF THE DRAWINGS

FIG. 1 is a cross sectional view of conventional thermoplastic pipe, such as PVC pipe;

FIG. 2 is an elevational view of the thermoplastic pipe of FIG. 1 and apparatus for reducing the dimension of the pipe;

FIG. 3 is a cross sectional view of the thermoplastic pipe as reduced in cross section in an initial step of the present process, this view being taken on the line 3—3 of FIG. 2;

FIG. 4 is a diagrammatic view showing application of the new pipe to an underground pipe, the reduced thermoplastic pipe being stored on a roll and being reheated for installation in the underground pipe to be rebuilt;

FIG. 5 is a diagrammatic view showing a detail of structure for expanding the reduced tubing and rounding it into a new pipe after it has been inserted in the existing underground pipe; and FIG. 6 is a diagrammatic view showing an alternative structure for rerounding and expanding the flattened pipe.

DETAILED DESCRIPTION OF PREFERRED EMBODIMENTS

With reference first to FIG. 1, the numeral 10 designates a type of pipe which is used to rebuild underground pipes or the like according to the present invention. A characteristic of the new pipe 10 is that it is formed of thermoplastic material and more particularly a material that is normally rigid and thick walled and can be made pliable upon heating and then reheated after once it has set up whereby to again be made pliable, and also to set up a final time to form a rigid pipe. A conventional and readily available pipe of this type comprises polyvinyl chloride (PVC) pipe with standard dimension ratios $$\left(\frac{\text{outside diameter}}{\text{wall thickness}}\right)$$

in the range of 13 to 65 presently available for underground lines such as drain lines, water lines, etc.

FIG. 2 illustrates apparatus 11 for shaping the conventional pipe 10 according to the present invention, and FIG. 3 illustrates in cross section the reduced shape thereof. More particularly, the PVC pipe 10 is heated in any conventional manner, such as by heating means 11a, to a sufficient temperature to make it pliable. It is then flattened and/or folded, by conventional apparatus 11, whereby to reduce its overall cross section dimension so that it is capable of being pulled into an underground pipe or the like in its reduced shape. The new pipe can also be manufactured in the reduced configuration. The reduced dimension is designated by the numeral 10a, and although it can possibly have use in a one step flattened condition, it is preferred that it first be flattened into a double wall thickness with opposite longitudinal side edges and then folded again along a longitudinal fold line intermediate the side edges a shown in FIG. 3 so that its widest cross sectional dimension is considerably less than the original round shape.

The reduced dimension pipe 10a can then be stored either in its flattened or folded condition, and preferably, it is wound while still pliable onto rolls 12. FIG. 4 also shows installation of a new pipe according to the invention, as will now be described.

Equipment for installing the reduced pipe in an existing underground pipe 14 or the like having spaced manholes 16, comprises an enclosure or shroud 18 with conventional mechanism for rotatably supporting a roll 12 of the present reduced pipe. Enclosure 18 can be mounted on a transporting vehicle 20 and has a depending spout 22 from which the reduced pipe can feed. The bottom end of the spout has a guide roller 23 for efficient angle feeding of the new reduced pipe. Enclosure 18 has heating means 24 associated therewith of a conventional type and capable of heating the roll 12 to a pliable state so that the pipe 10a can be unrolled therefrom.

According to the invention, the enclosure 18 is transported to an opening, such as a manhole 16, at a pipe section 14 to be repaired. The end of the reduced pipe 10a is connected to a pull line 26 made available from an adjacent opening in the pipe, such as another manhole, and connected by clamp means 28 to the free end of the new pipe. The new pipe is made pliable from heating by heater 24 and the pull line 26 then activated to pull it through the pipe. After inserting the reduced new pipe, it is then heated and expanded to a round or substantially round form to provide a pipe which will set up into a thick walled, rigid or semi-rigid structure.

FIG. 5 illustrates one manner of expanding the reduced dimension pipe after it has been pulled into the original pipe to be rebuilt. Such comprises a pair of plugs 30 and 32 installed at opposite ends of the reduced pipe, namely, the plug 30 being installed at a cut portion of the new pipe at the installing end and the plug 32 being installed in the leading or pull line end after disconnection of the pull line. Each of plugs 30 and 32 has peripheral expanding gasket members 34 arranged for releasable sealing engagement with the original pipe 14 and the new pipe 10a and operated by pressure lines 36, such as air pressure lines, leading to control means above ground. Plug 30 has an inlet conduit 38 therethrough for an expanding material such as live steam or hot water, such conduit having a suitable control valve 40 therein as well as a pressure gauge 42 and relief valve 44. Plug 32 has a discharge conduit 46 communicating with the area between the two plugs and suitably valved at 48. By closing valve 48 in plug 32 live steam or hot water is introduced through plug 30 to provide expansion of the reduced pipe into a new round pipe.

FIG. 6 shows another type of apparatus for expanding the reduced pipe. Such apparatus comprises a mandrel 50 having heating means 52 therein capable of heating the new pipe into a pliable state. Mandrel 52 has connection to a pull cable 54 or other means for drawing it through the original pipe. Upon proper heating of the mandrel and pulling it through the original pipe, it will expand the new pipe to the desired diameter.

A third method of heating, rerounding and expanding the new pipe involves flushing hot water or steam down the pipe to be rebuilt alongside the folded new pipe until the desired temperature is achieved at the downstream end. Once the desired temperature is reached, the new pipe is pressurized with hot water and expanded under pressure to fit.

In a specific pipe reconstruction process, conventional PVC pipe is obtained which is a ½ inch plus or minus smaller in outside diameter than the inner diameter of the pipe to be rebuilt and itself having standard dimension ratios of wall thickness to outside diameter as noted hereinbefore. The PVC tubing is heated to approximately 210° F. and reduced to the shape shown in FIG. 3. Although the new pipe can possibly be used just by flattening it in one plane, as stated hereinbefore, it preferably is flattened and then folded double as shown in FIG. 3 to minimize its overall dimension. The reduced pipe can then be stored on large spools so that it can be trucked to the site. When being installed in the original pipe, the new pipe is again heated so as to be made pliable and capable of being pulled through the pipe to be rebuilt. Thereupon, it is heated, rerounded, and, if desired, expanded. Rerounding and expansion are achieved by plugged areas as illustrated in FIG. 5, physically expanded by a mandrel 50 as shown in FIG. 5, or by the heating and pressurization process described. The rerounded pipe thus forms a pipe inside an existing pipe and can withstand external presures up to and greatly exceeding 4 pounds per square inch.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A method of lining an existing pipeline with a substantially rigid thermoplastic pipe comprising the steps of:

manufacturing a substantially rigid, thermoplastic pipe in a flattened and folded shape in at least a length comparable to the length of an existing pipeline to be lined;

said flattened and folded thermoplastic pipe having cross-sectional dimensions less than the cross-sectional dimensions of the lumen of the existing pipeline to be lined to facilitate insertion of the flattened and folded pipe into the existing pipeline;

storing the flattened and folded pipe on storage means in a layered condition to facilitate transport of the flattened and folded pipe to an installation site;

heating the flattened and folded pipe at the installation site while the pipe remains in the flattened and folded shape;

removing the heated, flattened and folded pipe from the storage means;

said heating of said pipe being sufficient to render said pipe softened and deformable to facilitate extending of the pipe from the storage means to a substantially elongated condition for insertion into the existing pipeline and to enable subsequent expanding of the pipe from the flattened and folded shape;

feeding the heated, elongated pipe through the lumen of the existing pipeline while it remains flattened and folded;

positioning the heated, elongated, flattened and folded pipe within the lumen of the existing pipeline;

heating the pipe, now positioned inside of the existing pipeline, the pipe remaining in its flattened and folded shape;

applying internal pressure to the pipe positioned inside the existing pipeline thereby expanding the heated pipe from the flattened and folded shape to cross-sectional dimensions comparable to the cross-sectional dimensions of the existing pipeline;

ceasing to apply heat to the pipe to allow the pipe to cool and again become substantially rigid thereby allowing the pipe to maintain its expanded shape; and, ceasing to apply internal pressure to the expanded substantially rigid thermoplastic pipe in place within the existing pipeline;

said expanded, substantially rigid pipe being capable of withstanding hydrostatic and earth pressures.

2. The method of claim 1, wherein the pipe is rigid enough to withstand hydrostatic and earth pressures of more than about four pounds per square inch.

3. The method of claim 1, wherein the pipe is formed of polyvinyl chloride.

4. The method of claim 1, wherein the pipe has a ratio of outside diameter to wall thickness in the range of about 13:1 to 65:1.

5. The method of claim 1, wherein the pipe in the stored condition is maintained wound on rolls.

6. The method of claim 5, wherein the pipe in the stored condition is maintained in an enclosure.

7. The method of claim 6, wherein the pipe in the stored condition is heated by applying heat within the enclosure.

8. The method of claim 1, wherein the pipe is the flattened and folded shape is positioned within the existing pipeline by pulling the pipe through the lumen of the existing pipeline.

9. The method of claim 1, further including the step of plugging opposite ends of the pipe for releasably sealing the ends thereof and applying a fluid under pressure to expand the pipe from the flattened and folded shape to the expanded shape.

10. The method of claim 9, including the step of adding live steam as the fluid under pressure.

11. The method of claim 9, including the step of applying hot water as the fluid under pressure.

12. The method of claim 1, including the step of drawing a heated mandrel through the interior of the pipe to change it from the flattened and folded shape to the expanded shape.

13. The method of claim 1, including the step of expanding the pipe by flushing hot fluid into the lumen of the existing pipeline adjacent to the pipe in the flattened and folded shape and pressurizing the interior lumen of the pipe with hot fluid under pressure to change the pipe to the expanded shape.

14. The method of claim 1, wherein the pipe in the flattened and folded shape is heated to about 210° F. to render it pliable to change it to the expanded shape.

* * * * *

US004867921B1

REEXAMINATION CERTIFICATE (3254th)

United States Patent [19]

Steketee, Jr.

[11] B1 4,867,921
[45] Certificate Issued Jul. 8, 1997

[54] PROCESS FOR INSTALLING A NEW PIPE INSIDE AN EXISTING PIPELINE

[75] Inventor: Campbell H. Steketee, Jr., Salem, Oreg.

[73] Assignee: Nu-Pipe, Inc., Salem, Oreg.

Reexamination Request:
No. 90/004,414, Oct. 18, 1996

Reexamination Certificate for:
Patent No.: 4,867,921
Issued: Sep. 19, 1989
Appl. No.: 76,973
Filed: Jul. 28, 1987

Related U.S. Application Data

[63] Continuation-in-part of Ser. No. 864,322, Mar. 31, 1986, abandoned.

[51] Int. Cl.⁶ .................... B29C 31/00; B29C 53/08; B29C 63/34
[52] U.S. Cl. .................... 264/36; 138/97; 156/287; 264/269; 264/322; 264/516; 425/384; 425/387.1; 425/503
[58] Field of Search .................... 264/36, 516, 230, 264/322, 269; 138/97, 98; 156/287; 425/384, 387.1, 392, 11, 59, 503

[56] References Cited

U.S. PATENT DOCUMENTS

| | | |
|---|---|---|
| 3,927,164 | 12/1975 | Shimabukuro . |
| 3,950,461 | 4/1976 | Levens . |
| 4,029,428 | 6/1977 | Levens . |
| 4,245,970 | 1/1981 | St. Onge . |
| 5,034,180 | 7/1991 | Steketee, Jr. . |

FOREIGN PATENT DOCUMENTS

| | | |
|---|---|---|
| 0280657 | 1/1966 | Australia . |
| 70793-87 | 10/1987 | Australia . |
| 1194264 | 1/1985 | Canada . |
| 0298125 A1 | 7/1988 | European Pat. Off. . |
| 1394807 | 3/1965 | France . |
| 2440086 | 3/1976 | Germany . |
| 58-88281 | 11/1981 | Japan . |
| 63-203316 | 2/1987 | Japan . |
| 454536 | 5/1988 | Sweden . |
| 1357355 | 6/1974 | United Kingdom . |
| 2018384 | 10/1979 | United Kingdom . |
| 2188695 | 10/1987 | United Kingdom . |
| 2213230 | 8/1989 | United Kingdom . |
| WO88/01707 | 3/1988 | WIPO . |

OTHER PUBLICATIONS

New Method for Repair Underground Conduits, Asahi Sinbun (Asahi News), Jun. 15, 1990.
"Plastic Parts That Remember" by Saul Ricklin, Jan. 10, 1974 issue of Machine Design, pp. 87–91.

*Primary Examiner*—Mathieu Vargot

[57] ABSTRACT

A thermoplastic pipe in a flattened and folded shape and of selected characteristics is formed by manufacturing it in this reduced shape. It is inserted in the flattened and folded shape and in a pliable state into a pipeline to be lined. It is then expanded and when set serves as a rigid or semi-rigid pipe within a pipeline capable of withstanding external hydrostatic and earth pressures. The thermoplastic pipe is heated during its installation for installing it into an existing pipeline and for expanding it.

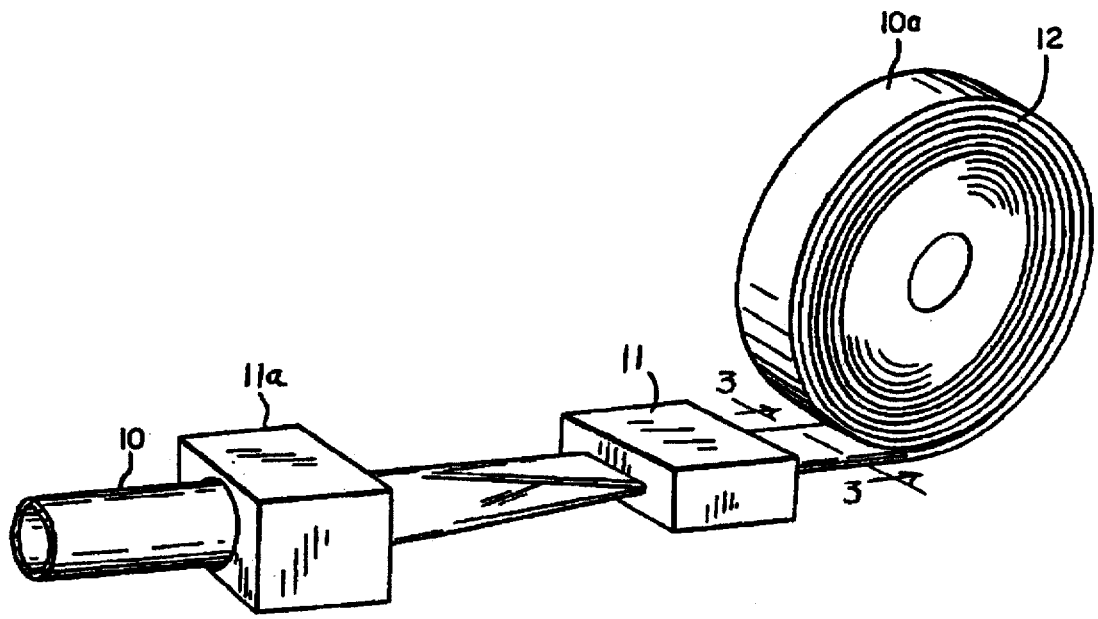

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–14 is confirmed.

* * * * *